3,591,553
ALKYLPHENYL 4 - HYDROXYISOPHTHALATES AND THEIR USE AS ULTRAVIOLET LIGHT STABILIZERS
Gerald R. Lappin and Gordon C. Newland, Kingsport, Tenn., assignors to Eastman Kodak Company, Rochester, N.Y.
No Drawing. Filed Dec. 26, 1968, Ser. No. 787,276
Int. Cl. C08f 45/58
U.S. Cl. 260—45.85                                    12 Claims

ABSTRACT OF THE DISCLOSURE

Alkylphenyl 4-hydroxyisophthalates are colorless compounds useful as ultraviolet light stabilizers for a variety of thermoplastic resins, particularly polyolefins such as polypropylene.

---

This invention relates to a novel group of compounds which are useful for incorporation into thermoplastic compositions to impart light stability thereto. This invention also relates to thermoplastic resin compositions having improved light stability Thermoplastic resin compositions are utilized in many areas, such as in the manufacture of signs, street light globes, ropes, lawn furniture, automotive parts, housing and agricultural implements, in which they are frequently exposed to the effects of the weather. It is well known that most thermoplastic resin compositions are highly subject to degradation by the ultraviolet radiation present in sunlight. Therefore, stabilizers are added to such compositions to increase the resistance of the composition to degradation by sunlight to enable them to be used outdoors.

A variety of ultraviolet light stabilizers have been employed heretofore. Among such stabilizers have been various esters of dihydroxyisophthalic acids and dihydroxyterephthalic acids such as disclosed in U.S. 2,952,661 and U.S. 3,154,574. A disadvantage of all of these dihydroxyphthalate esters is that they are inherently yellow compounds and impart an initial yellow color to plastics containing them which tends to darken upon exposure to light. With polyolefins these dihydroxyphthalate esters have certain compatibility limitations.

In accordance with this invention there are provided alkylphenyl esters of 4 - hydroxyisophthalic acid which are colorless compounds useful as ultraviolet light stabilizers for a variety of thermoplastic resins. In their capacity as ultraviolet light stabilizers the specific ester compounds of this invention are more effective than the above mentioned esters of dihydroxyphthalic acids as well as such related compounds as the aryl esters of isophthalic or terephthalic acids disclosed in U.S. 3,080,339 and the esters disclosed in U.S. 3,248,248.

The alkylphenyl esters of 4-hydroxyisophthalic acid of this invention are defined by the formula

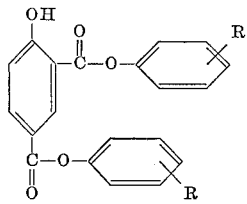

wherein each R, independently, is an alkyl radical having 4 to 18 carbon atoms. These alkyl radicals may be either straight or branched chain.

These esters may be made by any of the known methods for esterifying aromatic acids with phenols, the aromatic acid in this case being 4-hydroxisophthalic acid. Suitable phenols include, among others, p-tert-butylphenol, p-n-butylphenol, p-(1,1,3,3 - tetramethylbutyl)-phenol, p-n-hexylphenol, p-n-octylphenol, p-tert-nonylphenol, p-n-dodecylphenol, p-tertdodecylphenol, p-(1-methylhexadecyl)phenol, p-n-octadecylphenol, m-pentadecylphenol, o-tert-butylphenol and the like.

The following examples will serve to further illustrate the preparation of the esters of the esters of this invention.

EXAMPLE I

Bis(4-tert-butylphenyl)-4-hydroxyisophthalate

A mixture of 36 g. (0.2 mole) of 4-hydroxyisophthalic acid, 63 g. (0.4 mole) of p-tert-butylphenol, 5 ml. of dimethylformamide and 250 ml. of toluene are stirred and heated to 100° C. in a flask equipped with a distillation head. To this mixture there is added dropwise over 15 min. 31 g. (0.2 mole) of phosphorus oxychloride. The temperature is then raised to 115° C. and toluene is distilled until the pot temperature reaches 125° C. The mixture is stirred at 125° C. for 3 hrs., cooled and poured into a mixture of ice and water. Methanol, 300 ml., is then added to the aqueous mixture and it is chilled until the product crystallizes. The crystalline product is separated and recrystallized from ethanol to give 41 g. of white crystals, M.P. 154–155° C. The structure is confirmed by its NMR spectrum to be bis(4 - tertbutylphenyl)-4-hydroxyisophthalate.

EXAMPLE II

Bis[4-(1,1,3,3-tetramethylbutyl)phenyl]-4-hydroxyisophthalate

Using a similar procedure as described in Example I, with the exception that p - (1,1,3,3-tetramethylbutyl)-phenol is employed in place of p-tert-butylphenyl, there is obtained a product having a melting point of 150–151° C. The NMR spectrum confirms the product to be bis-[4 - (1,1,3,3 - tetramethylbutyl)phenyl]4 - hydroxyisophthalate.

EXAMPLE III

Bis(4-n-dodecylphenyl)4-hydroxyisophthalate

The procedure outlined in Example I is again employed but p-n-dodecylphenol is substituted for the p-tert-butylphenol. The product obtained is an oil and is confirmed by its NMR spectrum to be bis(4-n-dodecylphenyl)4-hydroxyisophthalate.

EXAMPLE IV

Bis(4-tert-dodecylphenyl)-4-hydroxyisophthalate

Again following the procedure outlined in Example I, but substituting p-tert-dodecylphenol in place of p-tert-butylphenol, there is obtained an oily product which is confirmed by its NMR spectrum to be bis(4-tert dodecylphenyl)4-hydroxyisophthalate.

EXAMPLE V

Bis(4-tert-nonylphenyl)-4-hydroxyisophthalate

Employing the procedure of Example I, but substituting p-tert-nonylphenol for p-tert-butylphenol, an oily product is obtained which is confirmed by its NMR spectrum to be bis(4-tert-nonylphenyl)-4-hydroxyisophthalate.

As mentioned previously, the esters of this invention are colorless compounds having utility as ultraviolet light stabilizers for a variety of thermoplastic resins such as polyolefins, polyesters, cellulose esters, poly(vinyl chloride) and poly(vinylidene chloride). These are particularly useful in polyolefins because of their good compatibility and noncoloring characteristics. More specifically, these esters are unusually effective stabilizers for polypropylene.

In general, the polyolefins in which the esters are effective ultraviolet light stabilizers are those derived from α-monoolefinic hydrocarbons having 2 to 20 carbon atoms. Polyolefins of this type are well known. It is pointed out that both homopolymers and copolymers are included. Some specific examples include polypropylene, polyethylene, copolymers of ethylene and propylene, poly-(1-butene), and the like.

The ester stabilizers of this invention may be incorporated into the thermoplastic resins by any conventional technique such as roll compounding. In general, a stabilizing amount is employed which is dependent upon the particular resin, the conditions under which the resin will be used, and the degree of stability desired. For most applications a suitable concentration will be in the range of about 0.05% to about 5.0% by weight.

Other additives may also be used in conjunction with the ester stabilizers of this invention. Among these are various antioxidants and other stabilizers including those which may act synergistically with the ester stabilizers. Pigments, dyes, fillers, antistatic agents, slip agents, and the like may also be used.

In the following examples the effectiveness of the alkylphenyl esters of 4-hydroxyisophthalic acid as ultraviolet light stabilizers in thermoplastic resins is demonstrated.

EXAMPLE VI

Several esters of this invention are compared to closely related esters which do not form a part of this invention for effectiveness in stabilizing polypropylene against the degradative effects of ultraviolet light. In the test individual samples of polypropylene and a particular ester were blended and dope-cast into 3-mil films. A dope-cast 3-mil film of polypropylene without any ester stabilizer is used as the control. The film samples are exposed to simulated weathering conditions in an Atlas Sunshine Arc Weather-Ometer, type XW-R, until they become brittle. The number of hours required for each sample to become embrittled is recorded and a stabilization factor is determined by dividing the number of hours to embrittlement for a stabilized sample by the number of hours to embrittlement for the control sample. In addition, a visual color comparison is made at the time the stabilizers are initially incorporated into the polypropylene and again after the samples have been exposed in the Weather-Ometer. The results of these tests are set forth in the following table.

cutting 0.5 x 1.5 inch test pieces therefrom. The test pieces are then held in a U-shape by a holder and exposed in a modified Atlas Twin-Arc Weather-Ometer until the sample cracked. A stabilization factor is determined as previously described. The results of the test are shown in Table B.

TABLE B

| Polyethylene plus the following stabilizer | Conc., wt. percent | Stabilization factor |
| --- | --- | --- |
| None | | 1 |
| Bis(p-tert-butylphenyl)4-hydroxyisophthalate | 1 | 2.8 |
| Bis(p-tert-octylphenyl)4-hydroxyisophthalate [1] | 1 | 2.8 |
| Bis(p-n-dodecylphenyl)4-hydroxyisophthalate | 1 | 6.4 |

[1] tert-Octyl=1,1,3,3-tetramethylbutyl.

Thus having described the invention in detail it will be understood by those skilled in the art that certain variations and modifications may be made without departing from the spirit and scope of the invention as outlined herein and in the appended claims.

We claim:
1. A composition comprising
 (A) a polyolefin derived from α-monoolefinic hydrocarbons having 2 to 20 carbon atoms, and
 (B) a stabilizing amount of a compound defined by the formula

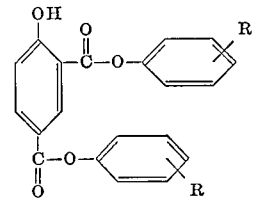

wherein each R, independently, is an alkyl radical having 4 to 18 carbon atoms.

2. A composition according to claim 1 wherein the stabilizing amount is about 0.05% to 5.0% by weight of the polyolefin.

3. A composition according to claim 1 wherein the polyolefin is polypropylene.

TABLE A

| | Polypropylene plus the following stabilizer | Conc., wt., percent | Stabilization factor | Color Initial | Color Exposed |
| --- | --- | --- | --- | --- | --- |
| 1 | None | | 1 | None | None. |
| 2 | Bis(4-tert-butylphenyl)2,5-dihydroxyterephthalate | 5 | 7 | Yellow exudes | Dark yellow. |
| 3 | Bis(p-tert-octylphenyl)isophthalate [1] | 5 | 4 | None | Yellow. |
| 4 | Bis(p-tert-octylphenyl)terephthalate [1] | 5 | 3 | do | Do. |
| 5 | Bis(p-tert-butylphenyl) 5-hydroxyisophthalate | 5 | 4 | do | Sl. yellow. |
| 6 | Bis(p-tert-octylphenyl) 5-hydroxyisophthalate [1] | 5 | 11 | do | Do. |
| 7 | Bis 4-tert-butylphenyl)4-hydroxyisophthalate | 5 | 11 | do | Do. |
| 8 | Bis(4-tert-octylphenyl)4-hydroxyisophthalate [1] | 5 | 23 | do | Do. |
| 9 | Bis(4-n-dodecylphenyl)4-hydroxyisophthalate | 5 | [2] >80 | do | Do. |
| 10 | Bis(4-tert-nonylphenyl)4-hydroxyisophthalate | 5 | [2] >20 | do | Do. |
| 11 | Bis(4-tert-dodecylphenyl)4-hydroxyisophthalate | 5 | [2] >20 | do | Do |

[1] Tert-Octyl=1,1,3,3-tetramethylbutyl.
[2] Tests have not yet terminated.

As is apparent from the above data, the alkylphenyl 4-hydroxyisophthalates of this invention (Examples 7–11) are more effective stabilizers than the most nearly comparable ester compounds (Examples 2–6). With regard to color it may be seen that Examples 2–4 have inferior color characteristics to the compounds of this invention. Only in the case of the esters of 5-hydroxyisophthalic acid are there comparable color characteristics but, as mentioned above, the stabilization effectiveness is inferior.

EXAMPLE VII

A similar test as described in Example VI is performed using polyethylene and only the alkylphenyl 4-hydroxyisophthalates of this invention to demonstrate the effectiveness of the compounds as ultraviolet light stabilizers. The samples in this test are prepared by hot rolling and molding the compositions into 0.125 inch thick plates and 4. A composition according to claim 3 wherein R is an alkyl radical having 8 to 18 carbon atoms.

5. A composition according to claim 4 wherein the stabilizing compound is selected from the group consisting of:
 (1) bis[4-(1,1,3,3-tetramethylbutyl)phenyl]4-hydroxyisophthalate;
 (2) bis[4-tert-nonylphenyl]-4-hydroxyisophthalate;
 (3) bis[4-tert-dodecylphenyl]4-hydroxyisophthalate;
 (4) bis[4-n-dodecylphenyl]4-hydroxyisophthalate; and
 (5) bis[4-tert-octylphenyl]4-hydroxyisophthalate.

6. A composition according to claim 5 wherein the stabilizing compound is bis[4-(1,1,3,3-tetramethylbutyl)phenyl]4-hydroxyisophthalate.

7. A composition according to claim 5 wherein the stabilizing compound is bis[4-tert-nonylphenyl]4-hydroxyisophthalate.

8. A composition according to claim 5 wherein the stabilizing compound is bis[4-tert-dodecylphenyl]4-hydroxyisophthalate.

9. A composition according to claim 5 wherein the stabilizing compound is bis[4-n-dodecylphenyl]4-hydroxyisophthalate.

10. A composition according to claim 5 wherein the stabilizing compound is bis[4-tert-octylphenyl]4-hydroxyisophthalate.

11. A composition according to claim 1 wherein the polyolefin is polyethylene.

12. A composition according to claim 11 wherein the stabilizing compound is bis[p-n-dodecylphenyl]4-hydroxyisophthalate.

References Cited

UNITED STATES PATENTS 3,248,248   4/1966   Coran et al. _____ 260—45.85

OTHER REFERENCES

Crystalline Olefin Polymers, Part II by Raff et al.

DONALD E. CZAJA, Primary Examiner

V. P. HOKE, Assistant Examiner

U.S. Cl. X.R.

106—181; 260—473